US008640301B1

(12) United States Patent
Lee et al.

(10) Patent No.: US 8,640,301 B1
(45) Date of Patent: Feb. 4, 2014

(54) DIRT CUP LATCH MECHANISM FOR VACUUM CLEANER

(75) Inventors: Wai Man Lee, Fanling (CN); Yu Xiaoming, Suzhou (CN); Zhu Jiangping, Suzhou (CN)

(73) Assignee: BISSELL Homecare, Inc., Grand Rapids, MI (US)

( * ) Notice: Subject to any disclaimer, the term of this patent is extended or adjusted under 35 U.S.C. 154(b) by 488 days.

(21) Appl. No.: 13/032,125

(22) Filed: Feb. 22, 2011

Related U.S. Application Data

(60) Provisional application No. 61/308,619, filed on Feb. 26, 2010, provisional application No. 61/353,384, filed on Jun. 10, 2010.

(51) Int. Cl.
| | |
|---|---|
| *A47L 9/10* | (2006.01) |
| *A47L 9/20* | (2006.01) |
| *A47L 5/00* | (2006.01) |
| *A47L 9/00* | (2006.01) |
| *E05C 1/02* | (2006.01) |
| *E05C 1/12* | (2006.01) |
| *F16B 21/00* | (2006.01) |

(52) U.S. Cl.
USPC ............ 15/347; 15/327.2; 292/137; 292/169; 292/170; 403/327

(58) Field of Classification Search
USPC .............................. 15/347, 353, 327.2, 327.6; 403/321–327; 292/137, 163, 169, 170, 292/16, 159, DIG. 37, DIG. 38
See application file for complete search history.

(56) References Cited

U.S. PATENT DOCUMENTS

| | | | |
|---|---|---|---|
| 6,922,868 B1 | 8/2005 | Jeong | |
| 7,380,308 B2 | 6/2008 | Oh et al. | |
| 7,578,027 B2 | 8/2009 | Kim | |
| 2007/0061998 A1 | 3/2007 | Kang | |
| 2007/0079473 A1 | 4/2007 | Min et al. | |
| 2007/0079474 A1 | 4/2007 | Min et al. | |
| 2008/0040883 A1* | 2/2008 | Beskow et al. | ................. 15/329 |

FOREIGN PATENT DOCUMENTS

| | | |
|---|---|---|
| EP | 1917896 A1 | 7/2007 |
| KR | 20030052212 A | 6/2003 |
| KR | 1020080009454 A | 1/2008 |

* cited by examiner

*Primary Examiner* — Bryan R Muller
(74) *Attorney, Agent, or Firm* — McGarry Bair PC

(57) ABSTRACT

A latch mechanism for selectively fastening a dirt cup to a vacuum cleaner having a locking recess. The latch mechanism can include a latch member having a portion that is selectively received in the locking recess and a cam follower surface, and a latch actuator comprising at least one button with a cam surface that faces the cam follower surface. When the latch mechanism is actuated, the cam surface bears against the cam follower surface, which initiates vertical movement of the latch member relative to the latch actuator. The latch member is thereby moved from a latched position in which the portion of the latch member is received within the locking recess to an unlatched position in which the portion of the latch member is removed from the locking recess, thereby allowing the dirt cup to be removed from the vacuum cleaner.

12 Claims, 16 Drawing Sheets

DIRT CUP LATCH MECHANISM FOR VACUUM CLEANER

CROSS-REFERENCE TO RELATED APPLICATION

This application claims the benefit of U.S. Provisional Application No. 61/353,384, filed Jun. 10, 2010, and U.S. Provisional Application No. 61/308,619, filed Feb. 26, 2010, both of which are incorporated herein by reference in their entirety.

BACKGROUND OF THE INVENTION

Vacuum cleaners can use a removable dirt cup to store collected dirt, dust and other contaminates for later disposal. The dirt cup can have an attachment mechanism that selectively secures the dirt cup to the vacuum cleaner in a position to receive dirt, dust, and other contaminates. The attachment mechanism also allows the dirt cup to be selectively removed from the vacuum cleaner to be emptied.

Some known attachment mechanisms require vertical movement of the dirt cup in order to secure or remove the dirt cup relative to the vacuum cleaner. For example, such attachment mechanisms raise the dirt cup to secure it to the vacuum cleaner and lower the dirt cup to remove it from the vacuum cleaner.

BRIEF DESCRIPTION OF THE INVENTION

According to one aspect of the invention, a vacuum cleaner comprises a main body having locking recess, a dirt cup removably mounted to the main body and having an outwardly-facing side wall, and a latch mechanism for selectively latching the dirt cup to the main body. The latch mechanism comprises a first latch member movably mounted to the side wall of the dirt cup and having a portion that is selectively received by the locking recess, the first latch member comprising a first cam follower surface thereon, and a latch actuator comprising at least one button having a cam surface facing the first cam follower surface. When the latch mechanism is actuated, the cam surface bears against the first cam follower surface to initiate vertical movement of the first latch member relative to the latch actuator, which moves the first latch member from a latched position in which the portion of the first latch member is received within the locking recess to an unlatched position in which the portion of the first latch member is removed from the locking recess, thereby allowing the dirt cup to be removed from the vacuum cleaner.

According to another aspect of the invention, a latch mechanism for selectively fastening a dirt cup to a vacuum cleaner having a locking recess comprises a first latch member having a portion that is selectively receivable by the locking recess and a first cam follower surface, and a latch actuator comprising at least one button having a cam surface facing the first cam follower surface. When the latch mechanism is actuated, the cam surface bears against the first cam follower surface to initiate vertical movement of the first latch member relative to the latch actuator, which moves the first latch member between a latched position in which the portion of the first latch member can be received within the locking recess and an unlatched position in which the portion of the first latch member can be removed from the locking recess.

DESCRIPTION OF EMBODIMENTS OF THE INVENTION

The present invention relates generally to dirt cups for vacuum cleaners. In one of its aspects, the invention relates to a vacuum cleaner with a removably-mounted dirt cup. In another of its aspects, the invention relates to a dirt cup with an improved latch mechanism for removably mounting the dirt cup to a vacuum cleaner. For purposes of description related to the figures, the terms "upper," "lower," "right," "left," "rear," "front," "vertical," "horizontal," and derivatives thereof shall relate to the invention as oriented in FIG. 1 from the perspective of a user behind the vacuum cleaner, which defines the rear of the vacuum cleaner. However, it is to be understood that the invention may assume various alternative orientations, except where expressly specified to the contrary. It is also to be understood that the specific devices and processes illustrated in the attached drawings, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise.

Figure 1:
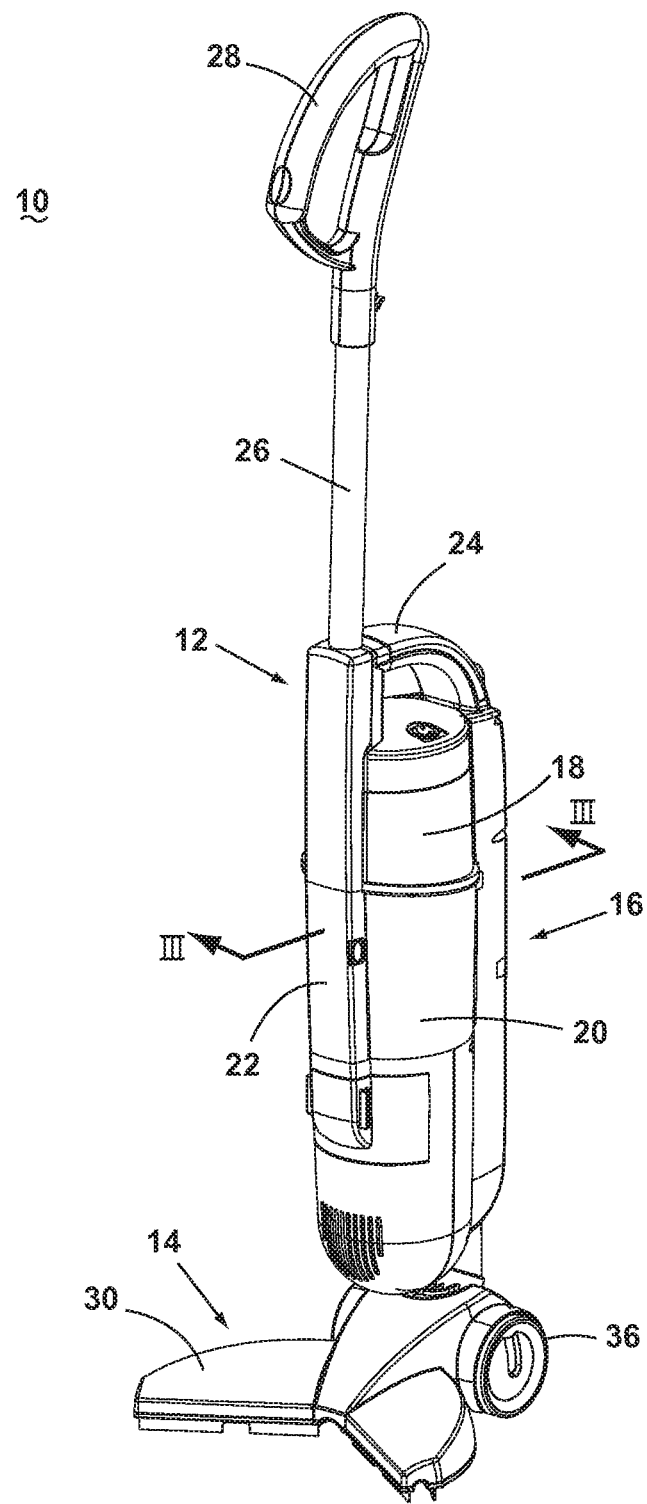
FIG. 1 is a front perspective view of a vacuum cleaner with a dirt cup and latch mechanism according to a first embodiment of the invention.

FIG. 1 is a perspective view of a vacuum cleaner 10 according to a first embodiment of the invention. As illustrated, the vacuum cleaner 10 comprises an upright handle assembly 12 pivotally mounted to a foot assembly 14. The upright handle assembly 12 comprises a main body 16 housing a filtration system 18 for separating contaminants from a working airstream and a removable dirt cup 20 for receiving and collecting the separated contaminants from the filtration system 18. The dirt cup 20 has a latch mechanism 22 for selectively latching the dirt cup 20 to the main body 16. The main body 16 also has a first hand grip 24 provided on an upper surface of the main body 16 that can be used for lifting the entire vacuum cleaner 10. A handle 26 extends upwardly from the first hand grip 24 and is provided with a second hand grip 28 at one end that can be used for maneuvering the vacuum cleaner 10 over a surface to be cleaned.

Figure 2:
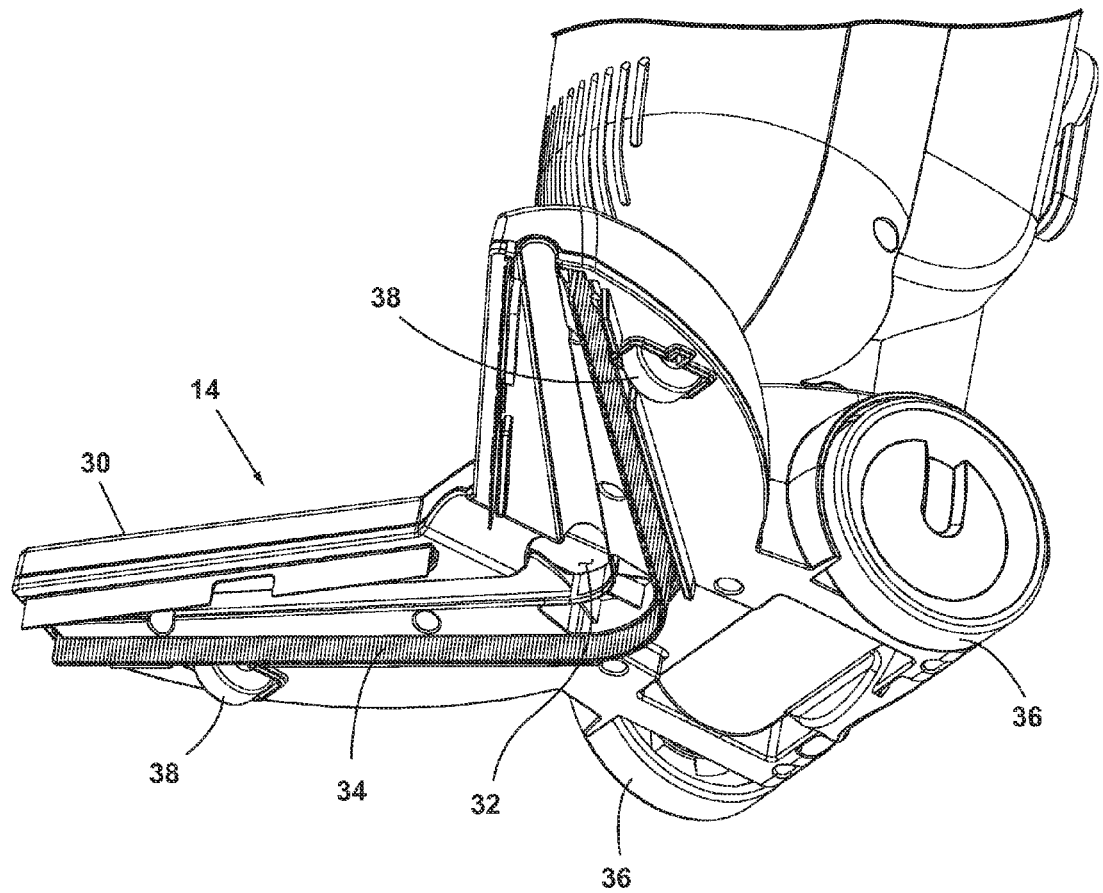
FIG. 2 is a bottom perspective view of the foot assembly 14 of the vacuum cleaner from FIG. 1.

FIG. 2 is a bottom perspective view of the foot assembly 14 of the vacuum cleaner from FIG. 1. The foot assembly 14 includes a foot assembly casing 30 having a suction nozzle opening 32 formed therein and an agitator 34 provided adjacent the suction nozzle opening 32. A working airpath (not shown) fluidly communicates the suction nozzle opening 32 with the filtration system 18 (shown in FIG. 1). The agitator 34 is illustrated as a stationary brush located rearwardly of the suction nozzle opening 32; however, it is within the scope of the invention for other types of agitators to be used, such as a rotating brushroll or a blade-type wiper. A pair of rear wheels 36 and a pair of front wheels 38 are provided on the foot assembly casing 30 for maneuvering the vacuum cleaner 10 over a surface to be cleaned.

Figure 3:
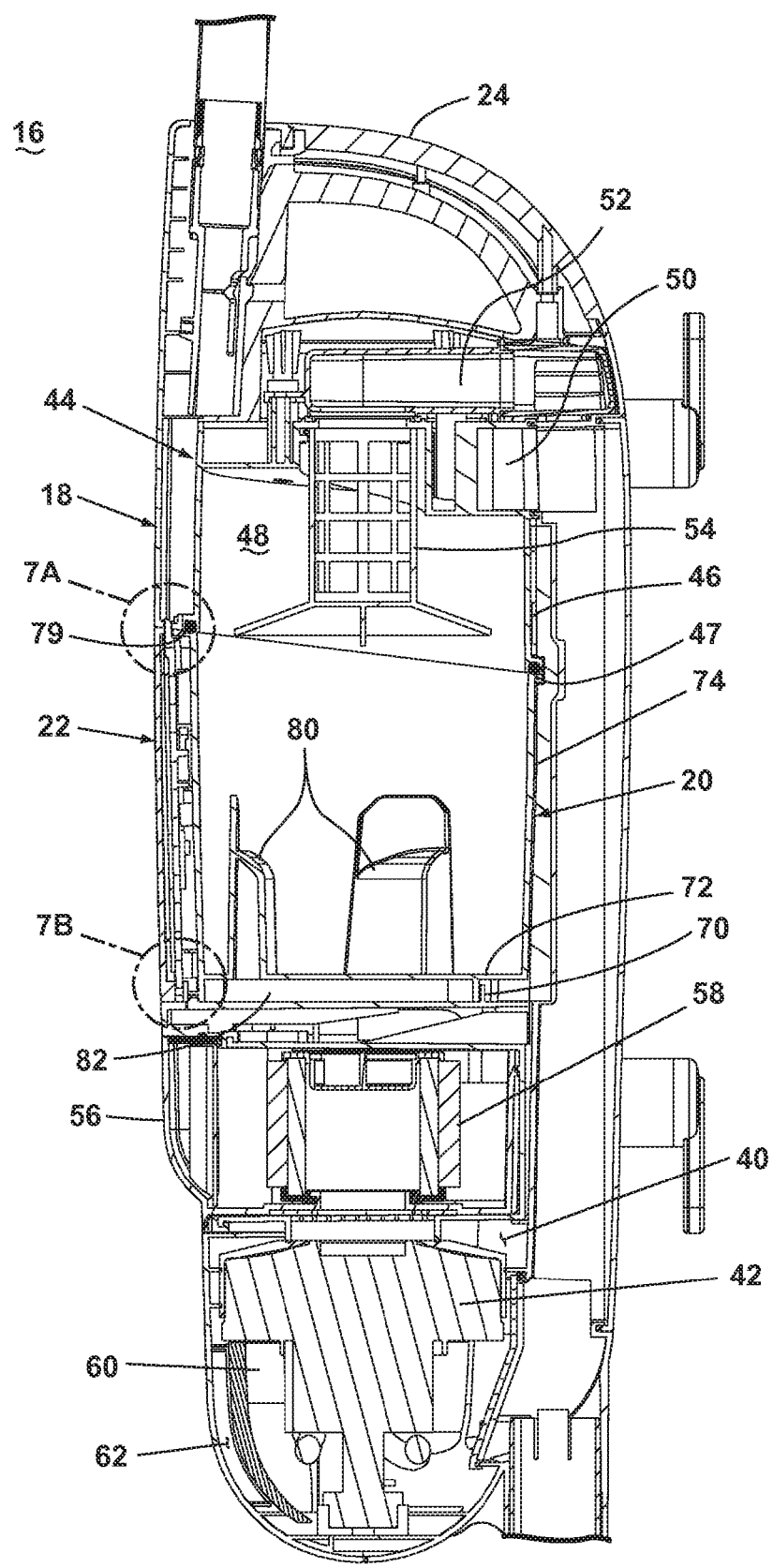
FIG. 3 is a cross-sectional view of the vacuum cleaner taken through line 3-3 of FIG. 1.

FIG. 3 is a cross-sectional view of the main body 16 taken through line 3-3 of FIG. 1. A motor cavity 40 is formed at a lower end of the main body 16 and contains a conventional suction source such as a motor/fan assembly 42 oriented vertically therein. The motor/fan assembly 42 is in fluid communication with the filtration system 18. Exemplary filtration systems can include a filter bag or a bagless cyclonic filter. As illustrated, the filtration system 18 includes at least a cyclone separator 44. The cyclone separator 44 includes a housing 46 having a lower edge 47 and defining a cyclonic chamber 48 having an air inlet 50 in fluid communication with the suction nozzle opening 32 (shown in FIG. 2) and an air outlet 52 in fluid communication with the motor/fan assembly 42. The inlet 50 can be oriented tangentially, such that the tangential airflow generated from inlet 50 is directed into the cyclonic chamber 48. A grill assembly 54 can be positioned between the cyclonic chamber 48 and the outlet 52.

A pre-motor filter housing 56 is formed above the motor cavity 40 and is in fluid communication with the motor/fan assembly 42. The filter housing 56 receives a removable pre-motor filter 58 for filtering working air as it exits the filtration system 18 prior to entering the motor cavity 40. A post-motor filter 60 is positioned downstream of the motor/fan assembly 42 to filter working air prior to exhausting the working air to the atmosphere through exhaust apertures 62 formed in the main body 16.

In operation, the vacuum cleaner 10 draws in dirt-laden air through the foot assembly 14 and into the filtration system 18 where the dirt is substantially separated from the air. The airflow, containing particulate matter, passes through air inlet 50 and into the cyclone chamber 48 to travel around the grill assembly 54. As the airflow travels about the cyclone chamber 48, heavier dirt particles are forced toward the side wall of the housing 46. These particles fall under the force of gravity and are collected in the dirt cup 20. As the inlet air traverses through the cyclone chamber 48, casting dirt particles toward the side wall of the housing 46, the inlet air will be drawn inwardly through the grill assembly 54, which changes the velocity of the air flow, causing it to shed additional dirt particles. These dirt particles are also urged toward the dirt cup 20 by the circulating air flow in cyclone chamber 48. The air flow then passes through the outlet 52 to the pre-motor filter housing 56 where the air passes through the pre-motor filter 58 where additional fine dirt particles are removed from the airflow. Therefore, the airflow continues on to the motor cavity 40, past the motor/fan assembly 42, and through the post-motor filter 60 to filter the airflow one final time prior to being exhausted through the exhaust apertures 62.

Figure 4:
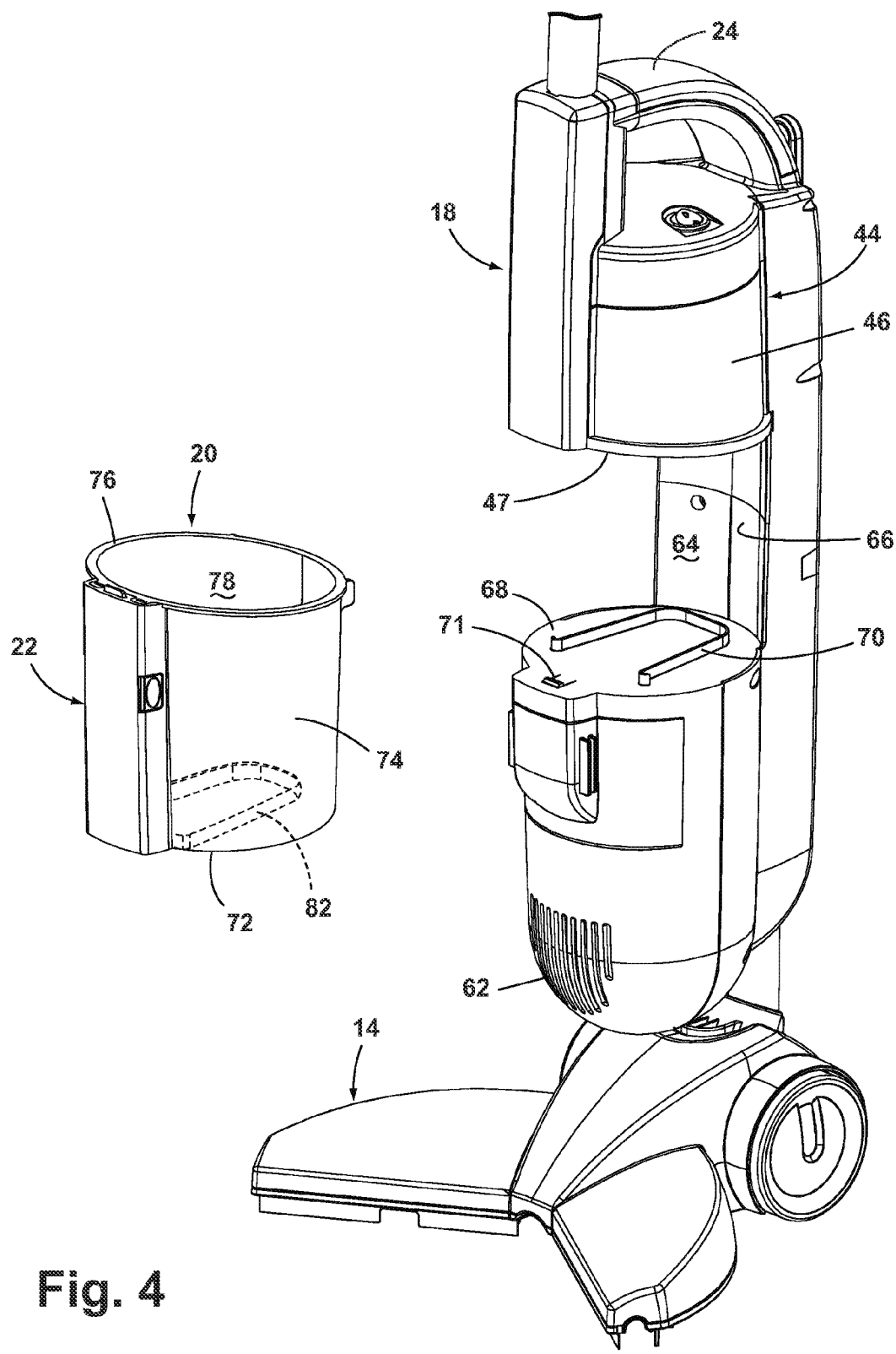
FIG. 4 is a front perspective view of the vacuum cleaner from FIG. 1, with the dirt cup shown removed from the vacuum cleaner.

Referring to FIG. 4, in which the dirt cup 20 is shown removed from the vacuum cleaner 10, the main body 16 comprises a dirt cup recess 64 that receives the dirt cup 20 when the dirt cup 20 is latched to the main body 16. The dirt cup recess 64 includes a rear wall 66 joined to a bottom wall 68. At least one receiving guide 70 is formed within the dirt cup recess 64, such as on the bottom wall 68 as shown in FIG. 2, for guiding the insertion of the dirt cup 20 into the dirt cup recess 64. A deflectable tab 71 is also formed on the bottom wall 68 to aid in securing the dirt cup 20 within the dirt cup recess 64.

With reference to FIGS. 3 and 4, the dirt cup 20 includes a bottom wall 72 with a peripheral side wall 74 extending upwardly therefrom to an upper edge 76 defining an open top 78. The upper edge 76 is oriented along an oblique plane relative to the bottom wall 72. The angle of the upper edge 76 may correspond to the angle of the lower edge 47 of the cyclone housing 46. A seal or gasket 79 can be provided between the lower edge 47 and the upper edge 76 to form an air-tight seal between the dirt cup 20 and the cyclone separator 44 when the dirt cup 20 is mounted to the main body 16 beneath the cyclone separator 44. One or more upstanding projection(s) or finger(s) 80 protrude upwardly from the inner surface of bottom wall 72 to inhibit the vacillation of the debris deposited in the dirt cup 20, thereby disrupting the currents that would tend to carry smaller dirt particles upwardly and back into the cyclonic air flow. The fingers 80 can also deflect dirt particles within the dirt cup 20 to further encourage agglomeration of the dirt particles within the dirt cup 20. Alternatively, the fingers 80 can be omitted if, for example, space is limited along the bottom wall 72. The bottom wall 72 further includes a receiving protrusion 82 on its outer surface that interacts with the receiving guide 70 to guide the insertion of the dirt cup 20 into the dirt cup recess 64. Specifically, the receiving protrusion 82 can be received within the inner boundary defined by the receiving guide 70 when the dirt cup 20 is mounted to the vacuum cleaner 10.

Figure 5:
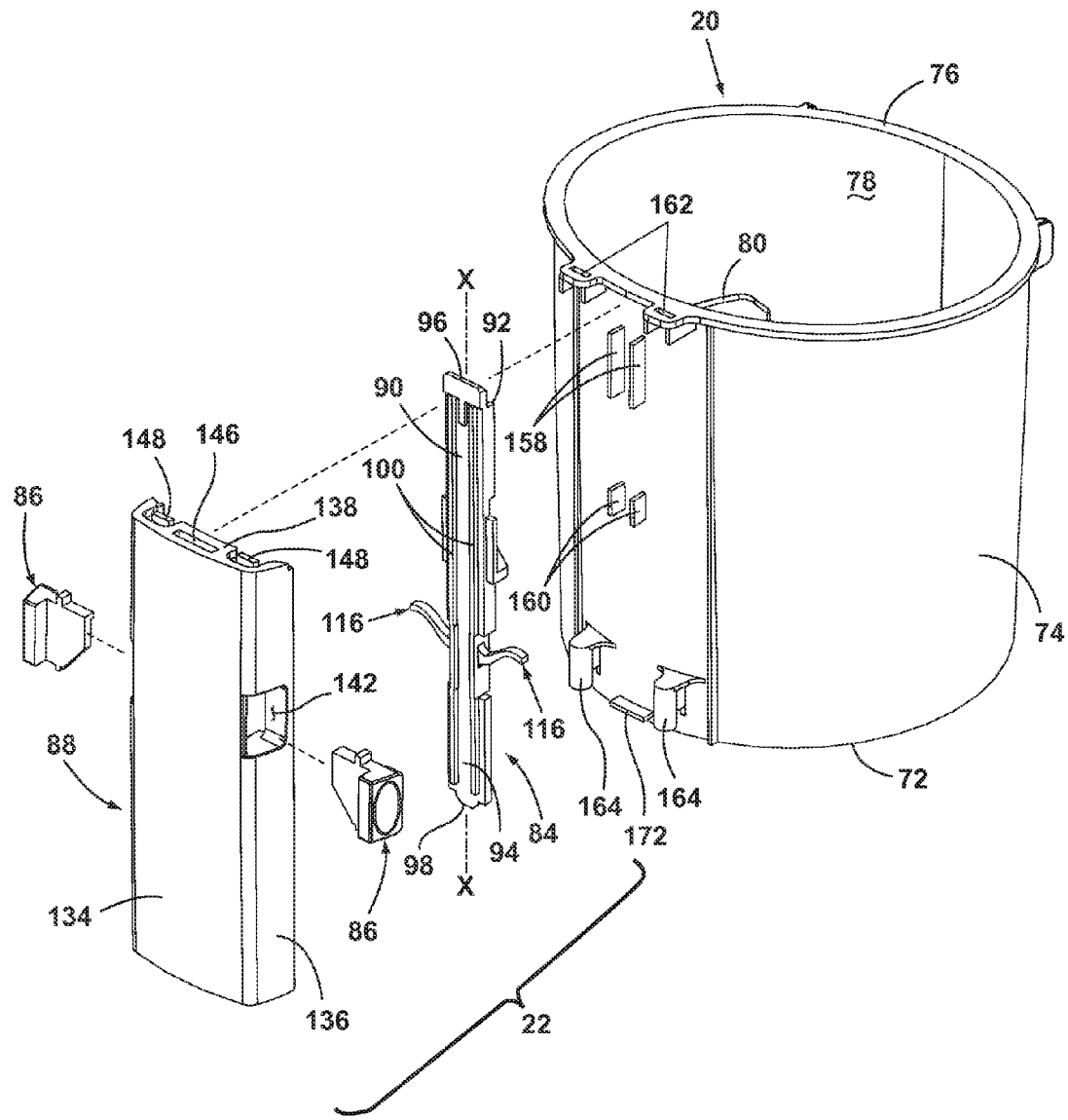
FIG. 5 is a front exploded view of the latch mechanism and dirt cup from FIG. 1.

FIG. 5 is a front exploded view of the latch mechanism 22 on the dirt cup 20. The latch mechanism 22 comprises a latch member 84 movably mounted to the side wall 74 of the dirt cup 20, a latch actuator 86 operably coupled to the latch member 84 for actuating the latch mechanism 22, and a cover 88 that at least partially mounts and encloses the latch member 84 and the latch actuator 86.

Figure 6:
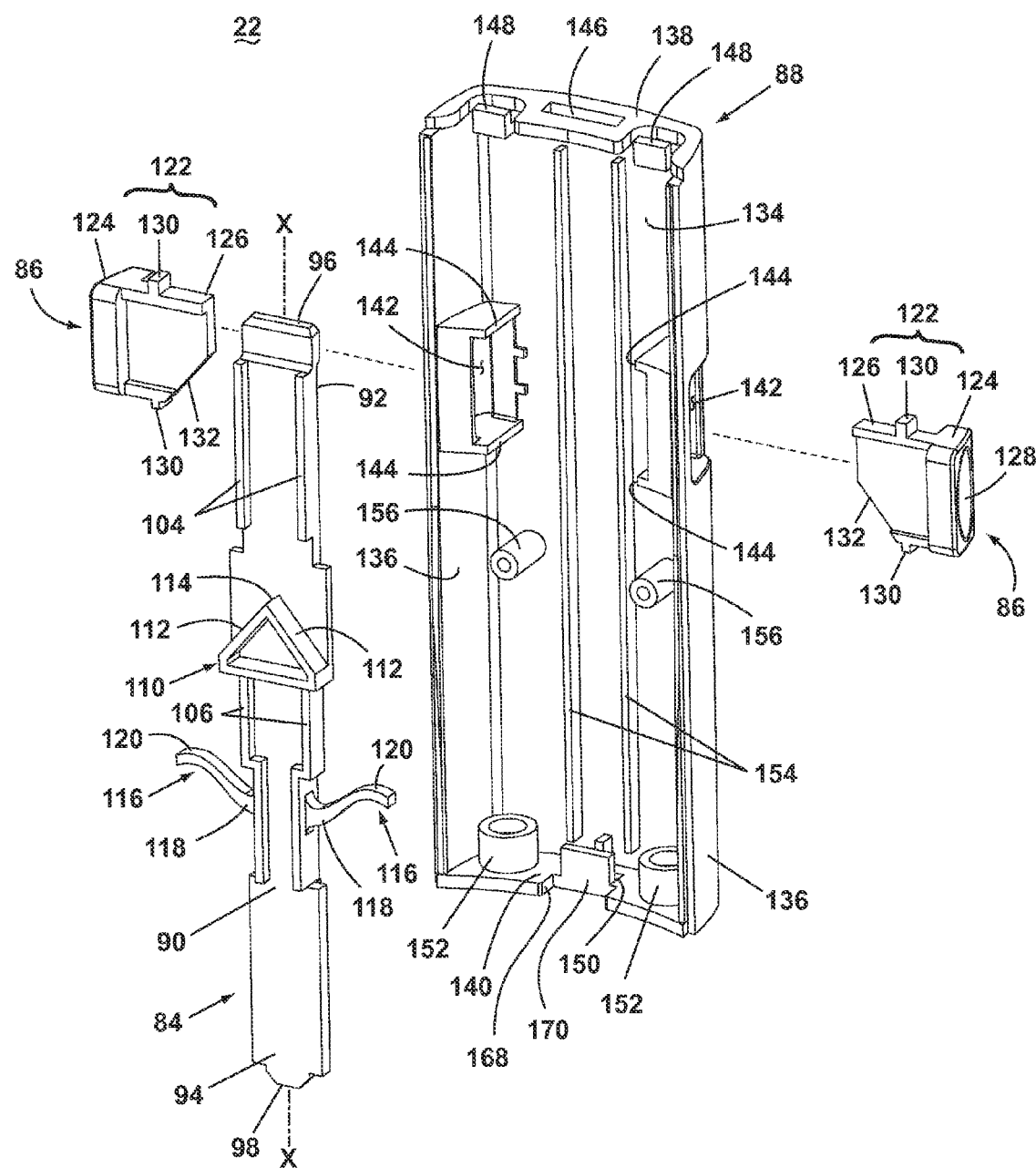
FIG. 6 is a rear exploded view of the latch mechanism from FIG. 1.

With additional reference to FIG. 6, which is a rear exploded view of the latch mechanism 22, the latch member 84 includes an elongated, generally flat body 90 having a first end 92 and a second end 94 opposite the first end 92. The latch member 84 has a medial vertical axis X that conceptually divides the body 90 into two lateral halves. A locking projection 96 is provided at the first end 92 and a relief projection 98 is provided at the second end 94. A first pair of rails 100 are provided on a front surface of the body 90, and a second and third pair of rails 104, 106 are provided on a rear surface of the body 90. The latch member 84 includes a cam follower surface illustrated herein as guide projection 110. The guide projection 110 is also provided on the rear surface of the body 90 between the second and third pair of rails 104, 106. The guide projection 110 may be segmented, such that the cam follower surface is divided into different segments. As shown herein, the guide project 110 is shaped like a triangle, and includes a pair of segments in the form of two ramped cam follower surfaces 112 extending upwardly toward each other to form a common edge 114 positioned along the medial vertical axis X.

One or more springs or biasing elements 116 can be provided to bias the latch mechanism 22 to a latched position or an unlatched position. As illustrated, two biasing elements 116 are provided, and bias the latch mechanism 22 to a latched position as will be described in more detail below. The biasing elements 116 can comprise springs in the form of resilient arms 118 integrally formed with the body 90 of the latch member 84. Each resilient arm 118 projects laterally from an opposing side of the body 90, and includes a curved portion 120.

The latch actuator 86 includes a pair of juxtaposed buttons 122 having a user-engagable portion 124 and a ramped portion 126. The user-engagable portion 124 can include a depression 128 formed therein to facilitate tactile location of the button 122 by a user. The ramped portion 126 can include a pair of tabs 130 projecting upwardly and downwardly therefrom and a cam surface 132. As shown herein, the cam surface 132 is ramped along the same direction as the cam follower surfaces 112.

The cover 88 includes a front wall 134 having two side walls 136 joined by an upper wall 138 and a lower wall 140 to define an open rear surface. A button aperture 142 is formed in each side wall 136, and receives one of the buttons 122 for slidable movement therein. At least one stop surface 144 is formed on the interior surface of each side wall 136 adjacent the button apertures 142. A locking projection aperture 146 is formed in the upper wall 138, with two tabs 148 formed on either side of the locking projection aperture 146. A relief aperture 150 is formed in the lower wall 140, with two hollow bosses 152 formed on either side of the relief aperture 150. A guide track 154 is formed on the interior surface of the front wall 134 and receives the first rails 100 on the latch member 84 to restrict the movement of the latch member 84 in a vertical direction along the medial vertical axis X, and prevent lateral movement of the latch member 84 with respect to the cover 88. A pair of bosses 156 also project from the interior surface of the front wall 134 and interact with the resilient arms 118 to limit the vertical movement of the latch member 84 relative to the cover 88. The lower wall 140 also includes a recessed portion 168 bordered on one side with an upstanding wall 170.

The latch mechanism 22 can be assembled to the dirt cup 20 using any suitable means. When the latch member 84 and cover 88 are assembled, which can be done prior to assembling the cover 88 to the dirt cup 20, the locking projection 96 is aligned with the locking projection aperture 146, the relief projection 98 is aligned with the relief aperture 150, the first rails 100 are received within the guide track 154, and the biasing elements 116 are above the bosses 156. When the latch actuator 86 and cover 88 are assembled, which can be done prior to assembling the cover 88 to the dirt cup 20, the buttons 122 are received in the button apertures 142, with the tabs 130 adjacent the stop surfaces 144 and the cam surfaces 132 facing the cam follower surfaces 112 of the guide projection 110.

The dirt cup 20 can be provided with features to simplify assembly and operation of the latch mechanism 22. As illustrated, the dirt cup 20 is provided with an upper track 158 and a lower track 160. The upper track 158 receives the second rails 104 on the latch member 84 and the lower track 160 receives the third rails 106 on the latch member 84 to restrict the movement of the latch member 84 in a vertical direction along the medial vertical axis X, and prevent lateral movement of the latch member 84 with respect to the dirt cup 20. It should be noted that while guide tracks for the latch member 84 shown on both the cover 88 and the dirt cup 20 of the present embodiment, the same function of restricting movement of the latch member 84 in a vertical direction along the medial vertical axis X and preventing lateral movement could be accomplished with a guide track on only one of the cover 88 and the dirt cup 20.

Two slots 162 are formed in the upper edge 76 of the dirt cup 20 and receive the tabs 148 on the cover 88. On the side wall 74 of the dirt cup 20 near the bottom wall 72, two cylindrical protrusions 164 with blind holes (not shown) formed therein are provided, and are aligned with the hollow bosses 152 on the cover 88 to receive fasteners (not shown) to secure the cover 88 in place over the latch member 84 on the dirt cup 20. A protruding wall 172 extends from the side wall 74 between the cylindrical protrusions 164. A tab recess 174 is formed by recessed portion 168, the upstanding wall 170, and the protruding wall 172 when the cover 88 is secured to the dirt cup 20.

Figure 7A:
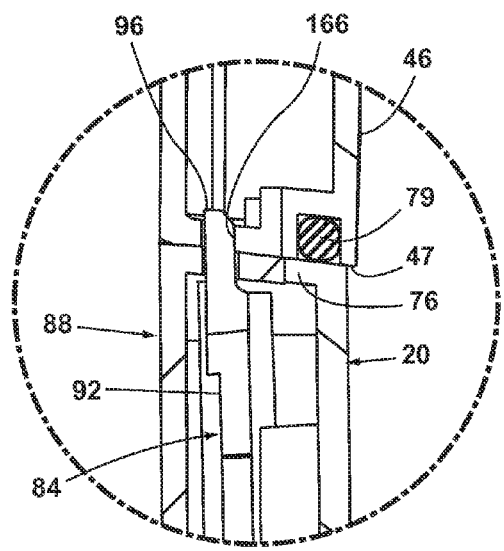
FIGS. 7A and 7B are cross-sectional views of areas 7A and 7B, respectively, of the vacuum cleaner with the latch mechanism in a latched position.
Figure 7B:
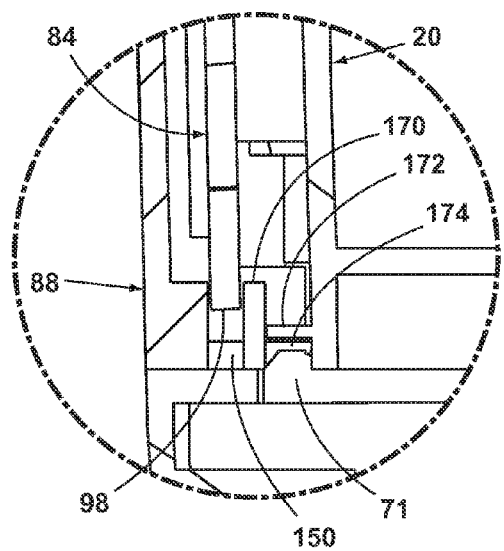
Figure 8:
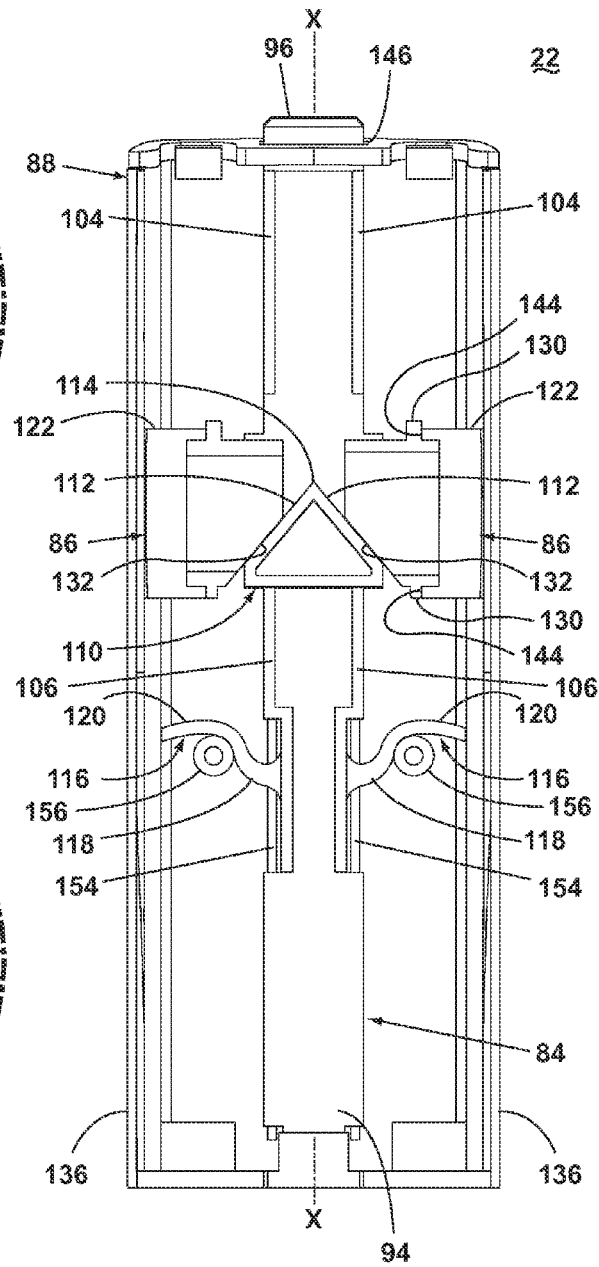
FIG. 8 is a rear view of the latch mechanism in the latched position shown in FIGS. 7A and 7B.
Figure 9A:
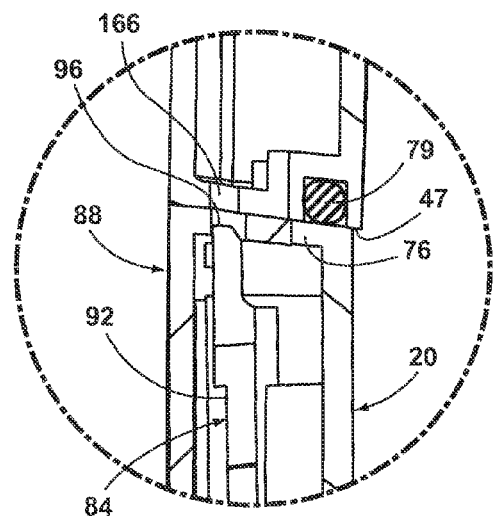
FIGS. 9A and 9B are cross-sectional views of areas 7A and 7B, respectively, of the vacuum cleaner in with the latch mechanism in an unlatched position.
Figure 9B:
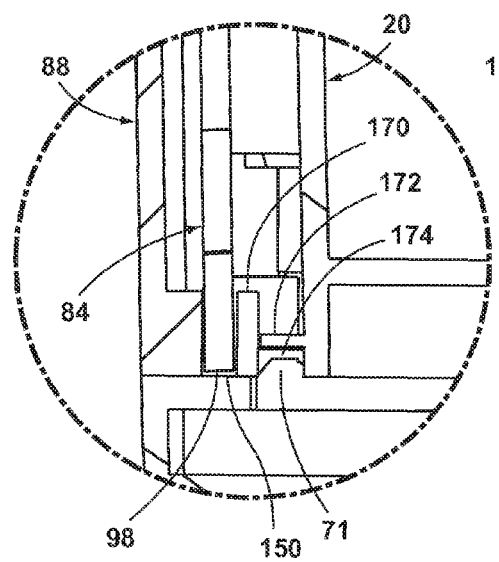
Figure 10:
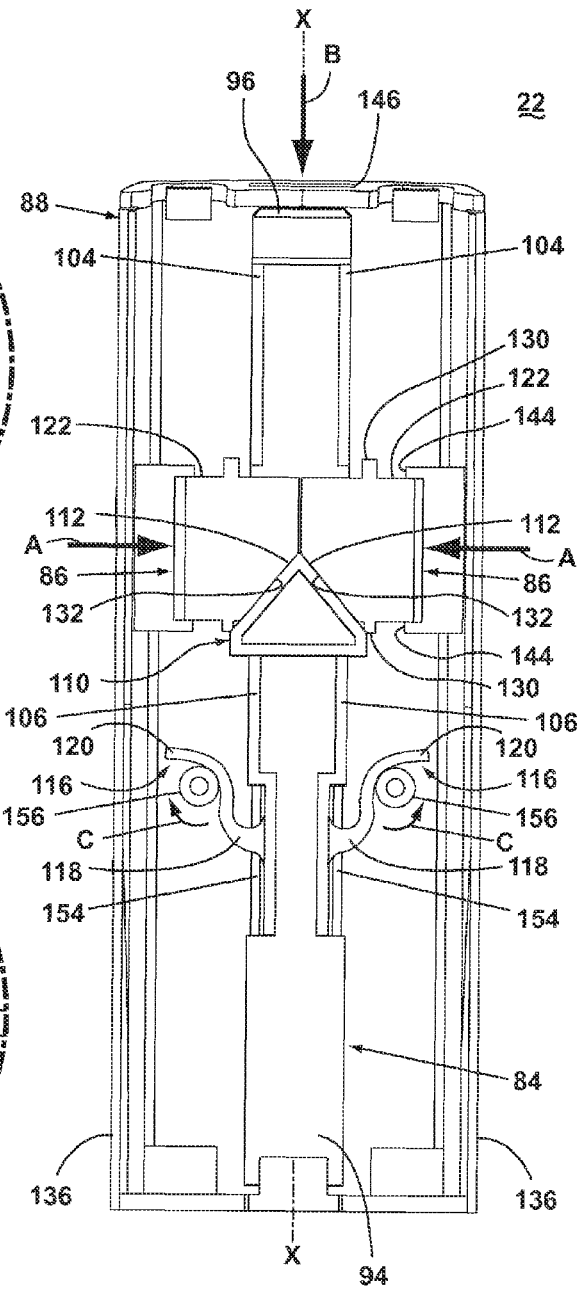
FIG. 10 is a rear view of the latch mechanism in the unlatched position shown in FIGS. 9A and 9B.

Once assembled, the latch mechanism 22 is movable between a latched position, shown in FIGS. 7A, 7B, and 8, in which the dirt cup 20 is secured to the vacuum cleaner 10, and an unlatched position, shown in FIGS. 9A, 9B, and 10, in which the dirt cup 20 can be removed from the vacuum cleaner 10. In the latched position, the dirt cup 20 is received within the dirt cup recess 64, with the bottom wall 72 of the dirt cup 20 resting on the bottom wall 68 of the dirt cup recess 64. The locking projection 96 is received within a locking recess 166 provided on the main body 16. As illustrated, the locking recess 166 can be formed in a portion of the cyclone separator 44, such as the lower wall 47 of the housing 46. The deflectable tab 71 is received within a tab recess 174. The biasing elements 116 are relaxed and the buttons 122 are spaced from each other by the guide projection 110.

To move the latch mechanism 22 from the latched position to the unlatched position, the latch actuator 86 is actuated. To do so, the buttons 122 are pressed inwardly toward medial vertical axis X as indicated by arrows A. As the buttons 122 are pressed inwardly, the cam surfaces 132 bear against the cam follower surfaces 112 and force the guide projection 110, and thus the latch member 84, downwardly along medial vertical axis X. Downward vertical movement of the latch member 84, which is guided relative to the cover 88 and the dirt cup 20 by the rails 100, 104, 106 in their respective tracks 154, 158, 160, causes the locking projection 96 to move out of the locking recess 166 as indicated by arrow B. The relief projection 98 moves into the relief aperture 150. At this time, the biasing elements 116 are deflected, such that the curved portions 120 engage the bosses 156 on the cover 88 to bend the resilient arms 118 as indicated by arrows C.

To remove the dirt cup 20 from the vacuum cleaner 10, with the latch mechanism 22 in the unlatched position, the buttons 122 are held pressed inwardly, and the dirt cup 20 is slid out of the dirt cup recess 64. As the edge of the dirt cup 20 defined by the bottom wall 72 and the side wall 74 strikes the deflectable tab 71, the tab 71 will flex downwardly out of the tab recess 174, allowing separation of the dirt cup 20 from the tab 71. The cover 88 can conveniently form a hand grip for carrying the dirt cup 20.

To remount the dirt cup 20 to the vacuum cleaner 10, the latch mechanism 22 is held in the unlatched position while the dirt cup 20 is seated in the dirt cup recess 64. Again, as the edge of the dirt cup 20 defined by the bottom wall 72 and the side wall 74 strikes the deflectable tab 71, the tab 71 will flex downwardly, allowing the dirt cup 20 to slide past the tab 71. Once the dirt cup is properly seated, the tab 71 will snap back into the tab recess 174. Releasing the buttons 122 causes automatic movement of the latch mechanism 22 back to the latch position by the biasing force of the biasing elements 116. Upward vertical movement of the latch member 84 can be configured to cease once the tabs 130 on the buttons 122 meet the stop surfaces 144. It should be noted that while the actuator 86 is shown with two buttons 122 that are pressed inwardly toward each other, the latch mechanism 22 can employ only one button to deflect the latch member 84.

Figure 11:
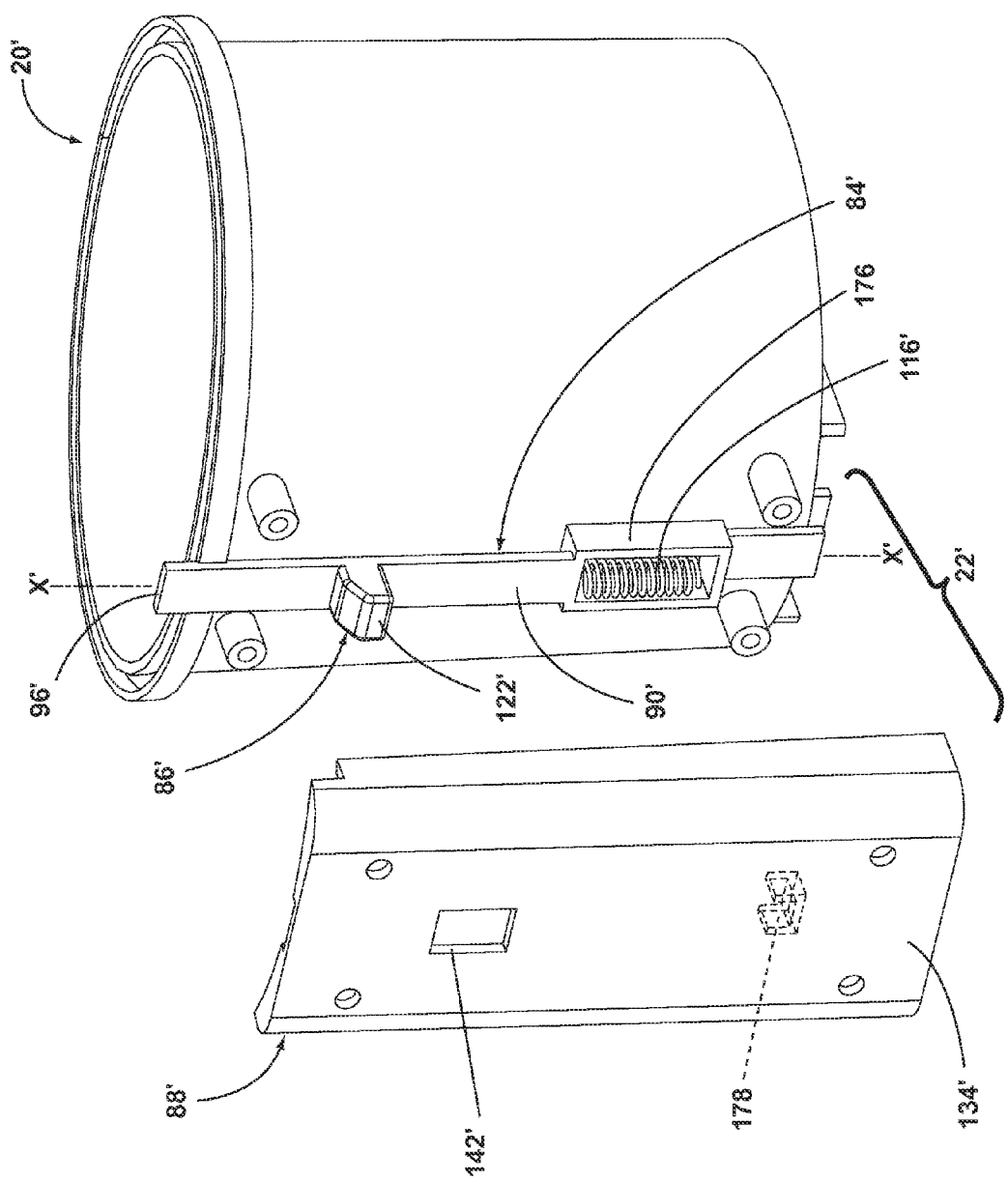
FIG. 11 is a front exploded view of a latch mechanism and dirt cup according to a second embodiment of the invention.

FIG. 11 is a front exploded view of a latch mechanism 22' and dirt cup 20' according to a second embodiment of the invention, where like features are indicated with the same reference numerals bearing a prime symbol ('). The second embodiment of the latch mechanism 22' and dirt cup 20' can be employed within the vacuum cleaner of FIG. 1 in place of the first embodiment of the latch mechanism 22 and dirt cup 20. In the second embodiment, the latch actuator 86' comprises a single button 122', which can be provided on the latch member 84'. As illustrated, the button 122' protrudes from a front surface of the body 90' and can be integrally formed with the body 90'. As such, the cover 88' includes a single aperture 142' formed in the front wall 134', through which the button 122' protrudes when the latch mechanism 22' is assembled with the dirt cup 20'. The spring or biasing element 116' comprises a single coil spring that is coupled between the latch member 84' and the cover 88', and that biases the latch mechanism 22' to the latched position. The body 90' can be provided with a frame 176 for receiving the coil spring 116'. A U-shaped catch 178 is formed on the inside of the front wall 134' of the cover 88', and fits within a lower portion of the frame 176; as such, the upper end of the coil spring 116' is bounded by the upper end of the frame 176 and the lower end of the coil spring 116' is bounded by the catch 178.

Figure 12:
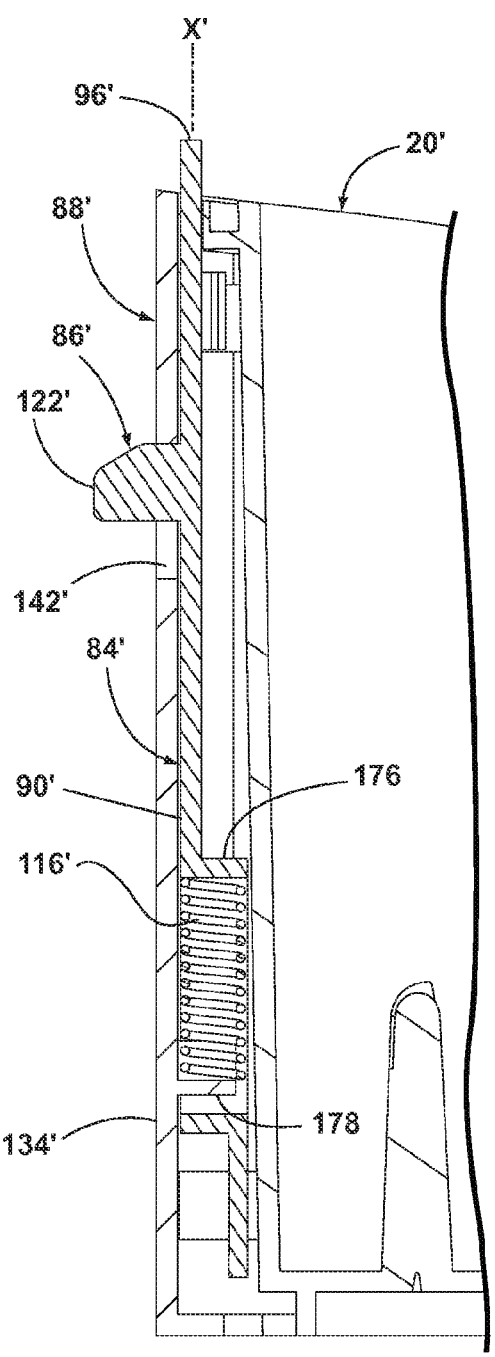
FIG. 12 is a cross-sectional view of the latch mechanism from FIG. 11, with the latch mechanism in a latched position.
Figure 13:
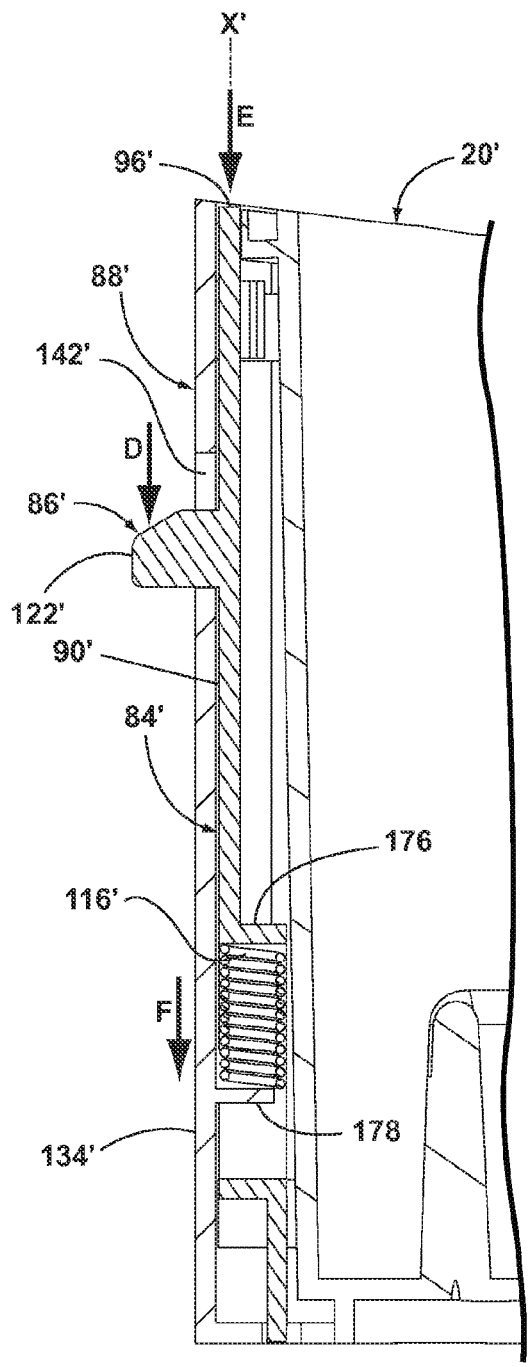
FIG. 13 is a cross-sectional view of the latch mechanism from FIG. 11, with the latch mechanism in an unlatched position.

Once assembled, the latch mechanism 22' is movable between a latched position, shown in FIG. 12, in which the dirt cup 20' is secured to the vacuum cleaner 10, and an unlatched position, shown in FIG. 13, in which the dirt cup 20' can be removed from the vacuum cleaner 10. To move the latch mechanism 22' from the latched position to the unlatched position, the latch actuator 86' is actuated. To do so, the button 122' is pressed downwardly, as indicated by arrow D, which causes downward movement of the latch member 84' along medial vertical axis X'. Like the first embodiment, downward vertical movement of the latch member 84' causes the locking projection 96' to move out of the locking recess 166 (see FIG. 9A), as indicated by arrow E. At this time, the coil spring 116' is compressed, as indicated by arrow F, by movement of the frame 176 relative to the catch 178 on the stationary cover 88'.

To remove the dirt cup 20' from the vacuum cleaner 10, with the latch mechanism 22' in the unlatched position, the button 122' is held pressed downwardly, and the dirt cup 20' is slid out of the dirt cup recess 64. To remount the dirt cup 20' to the vacuum cleaner 10, the latch mechanism 22' is held in the unlatched position while the dirt cup 20' is seated in the dirt cup recess 64. Releasing the latch actuator 86' causes automatic movement of the latch mechanism 22' back to the latch position by the expansion of the coil spring 116'. Upward vertical movement of the latch member 84' can be configured to cease once the coil spring 116' has expanded.

Figure 14:
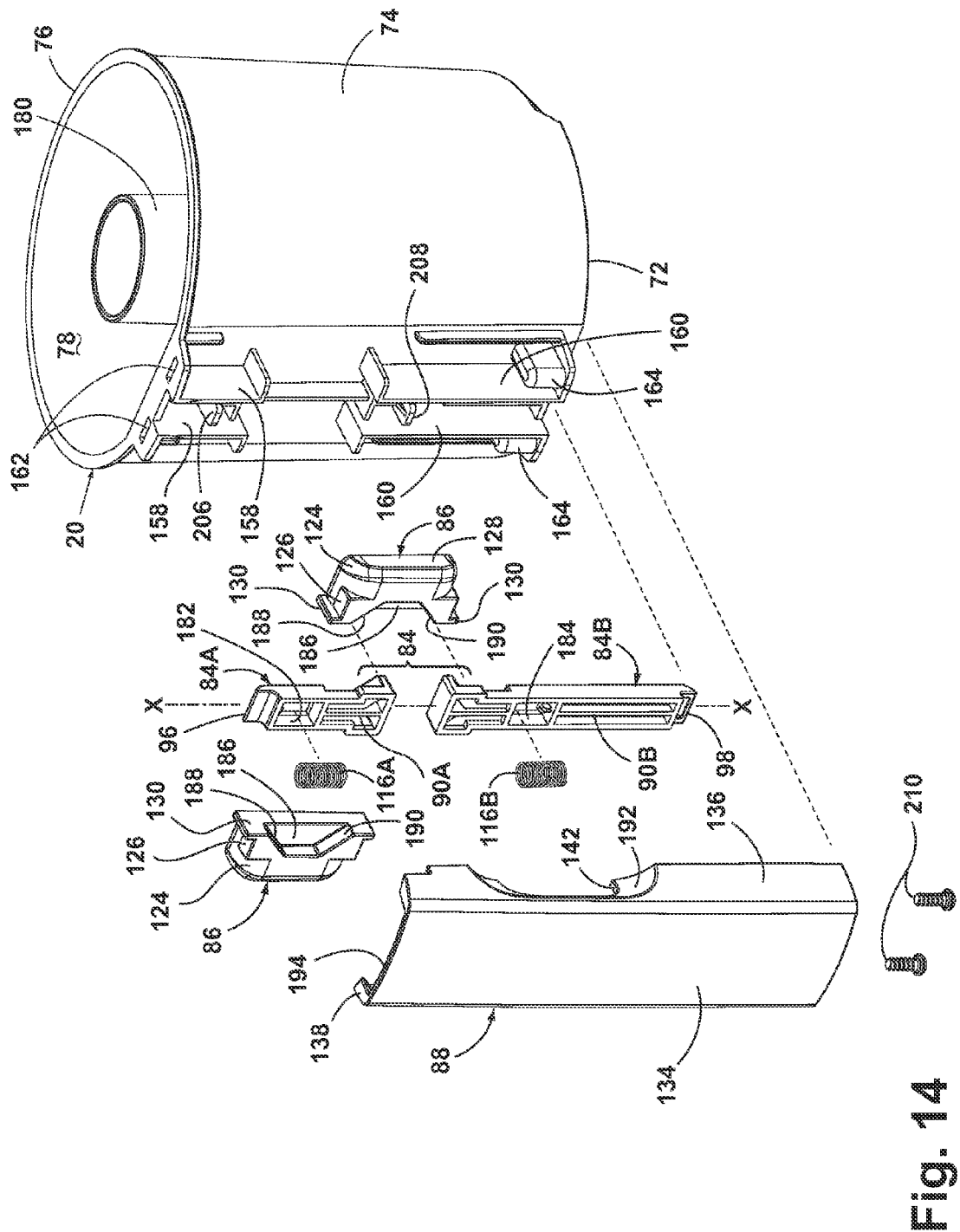
FIG. 14 is a front exploded view of a latch mechanism and dirt cup according to a third embodiment of the invention.

FIG. 14 is a front exploded view of a latch mechanism 22 and dirt cup 20 according to a third embodiment of the invention, where like features are indicated with the same reference numerals of the first embodiment. The second embodiment of the latch mechanism 22 and dirt cup 20 can be employed within the vacuum cleaner of FIG. 1, with or without some modification. For example, the cyclone separator 44 of FIG. 1 can be modified to function with a bottom air outlet, as defined by an air conduit 180 extending through the dirt cup 20.

Like the first embodiment shown in FIG. 5, the third embodiment of the latch mechanism 22 comprises the latch member 84 movably mounted to the side wall 74 of the dirt cup 20, the latch actuator 86 operably coupled to the latch member 84 for actuating the latch mechanism 22, and the cover 88 that at least partially mounts and encloses the latch member 84 and the latch actuator 86.

Figure 15:
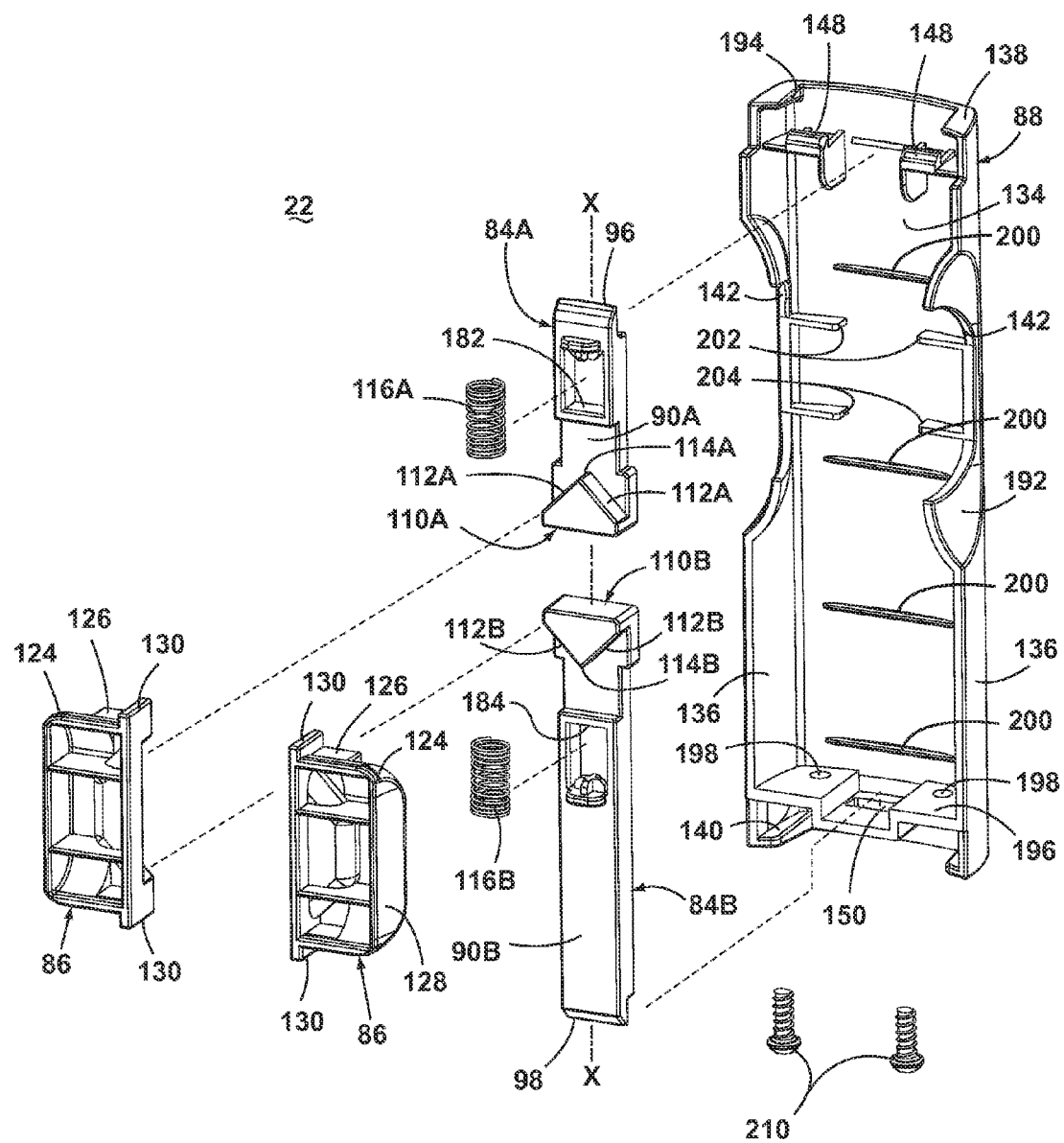
FIG. 15 is a rear exploded view of the latch mechanism from FIG. 14.

With additional reference to FIG. 15, which is a rear exploded view of the latch mechanism 22, the latch member 84 is split and includes a first latch member 84A and a second latch member 84B, which are illustrated herein as two elongated, generally flat bodies, an upper body 90A and a lower body 90B, respectively. The first and second latch members 84A, 84B can be vertically aligned with each other along medial vertical axis X that passes through each latch member 84A, 84B and conceptually divides each latch member 84A, 84B into two lateral halves. The locking projection 96 is provided at an upper end of the upper body 90A and the relief projection 98, which in the third embodiment may also be considered a second or lower locking projection 98, is provided at a lower end of the lower body 90B. The latch members 84A, 84B can each include a cam follower surface respectively illustrated herein as an upper guide projection 110A provided on the upper body 90A and a lower guide projection 110B provided on the lower body 90B. The guide projections 110A, 110B can be in opposing vertical relationship to each other, and may be segmented, such that the cam follower surfaces are each divided into different segments. As shown herein, the upper guide projection 110A includes a pair of segments in the form of two ramped cam follower surfaces 112A, and may generally be shaped like a triangle, with the ramped cam follower surfaces 112A extending upwardly toward each other to form a common edge 114A positioned along the medial vertical axis X. The lower guide projection 110B also includes a pair of segments in the form of two ramped cam follower surfaces 112B, and may generally be shaped like a triangle, with the ramped cam follower surfaces 112B extending downwardly toward each other to form a common edge 114B, also positioned along the medial vertical axis X.

One or more springs or biasing elements 116 can be provided to bias the latch mechanism 22 to a latched position or an unlatched position. As illustrated, two biasing elements 116 are provided, an upper biasing element 116A associated with the upper body 90A and a lower biasing element 116B associated with the lower body 90B, and together bias the latch mechanism 22 to a latched position as will be described in more detail below. The biasing elements 116A, 116B can comprise coil springs coupled between the latch members 84A, 84B and the dirt cup 20. Each of the upper and lower body 90A, 90B can be provided with a frame 182, 184, respectively for receiving the coil springs 116A, 116B.

The latch actuator 86 can be similar to the latch actuator 86 of the first embodiment, but the ramped portion 126 can include a groove 186 having a pair of opposing ramped cam surfaces, an upper cam surface 188 and a lower cam surface 190.

The cover 88 can also be similar to the cover 88 of the first embodiment, but the button apertures 142 in each side wall 136 may be formed in a contoured or depressed portion 192 of the side wall 136. A locking projection recess 194 is formed in the upper wall 138, and the two tabs 148 are formed on the front wall 140 below the locking projection recess 194. An intermediate wall 196 is spaced from the lower wall 140, and includes the relief aperture 150 and two through-holes 198 formed on either side of the relief aperture 150. A series of lateral rails 200 are formed on the interior surface of the front wall 134 and space the bodies 90A, 90B of the latch members 84A, 84B away from the front wall 134 of the cover 88 to reduce the friction between the latch members 84A, 84B and the cover 88 as the bodies 90A, 90B move relative to the cover 88. A guide track for the latch members 84A, 84B is formed on the interior surface of the front wall and is defined by an upper pair of lateral protrusions 202 and a lower pair of lateral protrusions 204 that restrict the movement of the latch members 84A, 84B in a vertical direction along the medial axis X, and prevent lateral movement of the latch members 84A, 84B with respect to the cover 88. The upper pair of lateral protrusions define a space between them that receives a portion of the upper body 90A and restricts the upper body 90A from moving laterally. Similarly, the lower pair of lateral protrusions define a space between them that receives a portion of the lower body 90B and restricts the lower body 90B from moving laterally.

The latch mechanism 22 can be assembled to the dirt cup 20 using any suitable means. When the latch members 84A, 84B and cover 88 are assembled, which can be done prior to assembling the cover 88 to the dirt cup 20, the locking projection 96 is aligned with the locking projection recess 194, the relief projection 98 is aligned with the relief aperture 150, the upper and lower bodies 90A, 90B are received within the space defined by the lateral protrusions 202, 204, and the biasing elements 116A, 116B are within the frames 182, 184. When the latch actuator 86 and cover 88 are assembled, which can be done prior to assembling the cover 88 to the dirt cup 20, the buttons 122 are received in the button apertures 142 and the guide projections 110A, 110B partially received within the grooves 186, with the upper and lower cam surfaces 188, 190 facing the cam follower surfaces 112A, 112B.

The dirt cup 20 can be provided with features to simplify assembly and operation of the latch mechanism 22. As illustrated, the dirt cup 20 is provided with the upper track 158 and the lower track 160, which respectively receive the upper body 90A and the lower body 90B to restrict movement of the latch members 84A, 84B in a vertical direction along medial vertical axis X and prevent lateral movement of the latch members 84A, 84B with respect to the dirt cup 20. It should be noted that while guide tracks for the latch members 84A, 84B shown on both the cover 88 and the dirt cup 20 of the present embodiment, the same function of restricting movement of the latch members 84A, 84B in a vertical direction along the medial vertical axis X and preventing lateral movement could be accomplished with a guide track on only one of the cover 88 and the dirt cup 20.

The two slots 162 are formed in the upper edge 76 of the dirt cup 20 and receive the tabs on the cover 88. On the side wall 74 of the dirt cup 20 near the bottom wall 72, the two cylindrical protrusions 164 with blind holes (not shown) formed therein are aligned with the through holes on the cover 88 to receive fasteners 210 to secure the cover 88 in place over the latch members 84A, 84B on the dirt cup 20. An upper catch 206 is formed on the side wall 74, and fits into the lower end of the frame 182 of the upper body 90A. As such, the upper end of the biasing element 116A is bounded by the upper end of the frame 182 and the lower end of the biasing element 116A is bounded by the upper catch 206. A lower catch 208 is formed on the side wall 74, and fits into the upper end of the frame 184 of the lower body 90B. As such, the upper end of the biasing element 116B is bounded by the upper end of the catch 208 and the lower end of the biasing element 116B is bounded by the lower catch 208.

Figure 16:
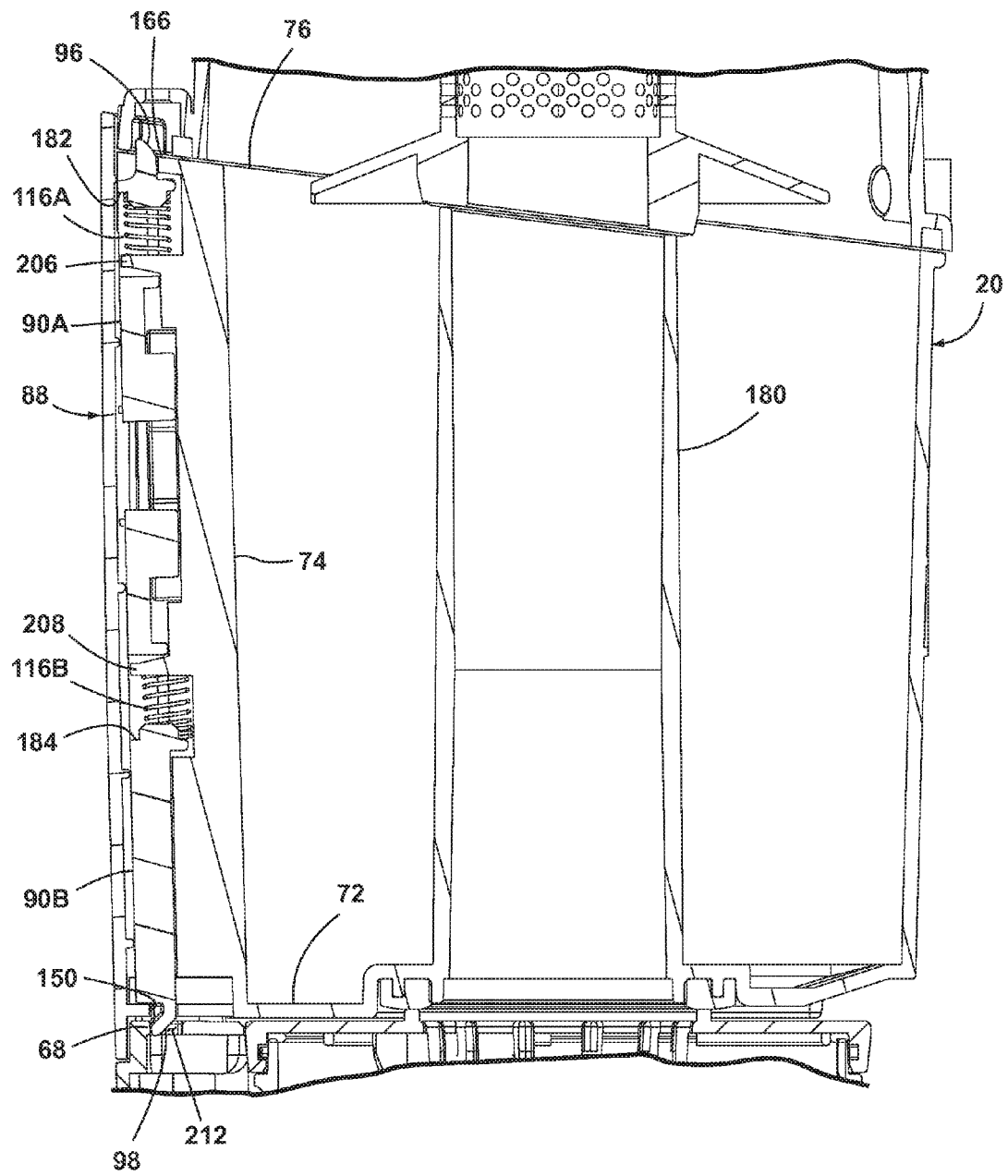
FIG. 16 is a cross-sectional view of the latch mechanism from FIG. 14, with the latch mechanism in a latched position.
Figure 17:
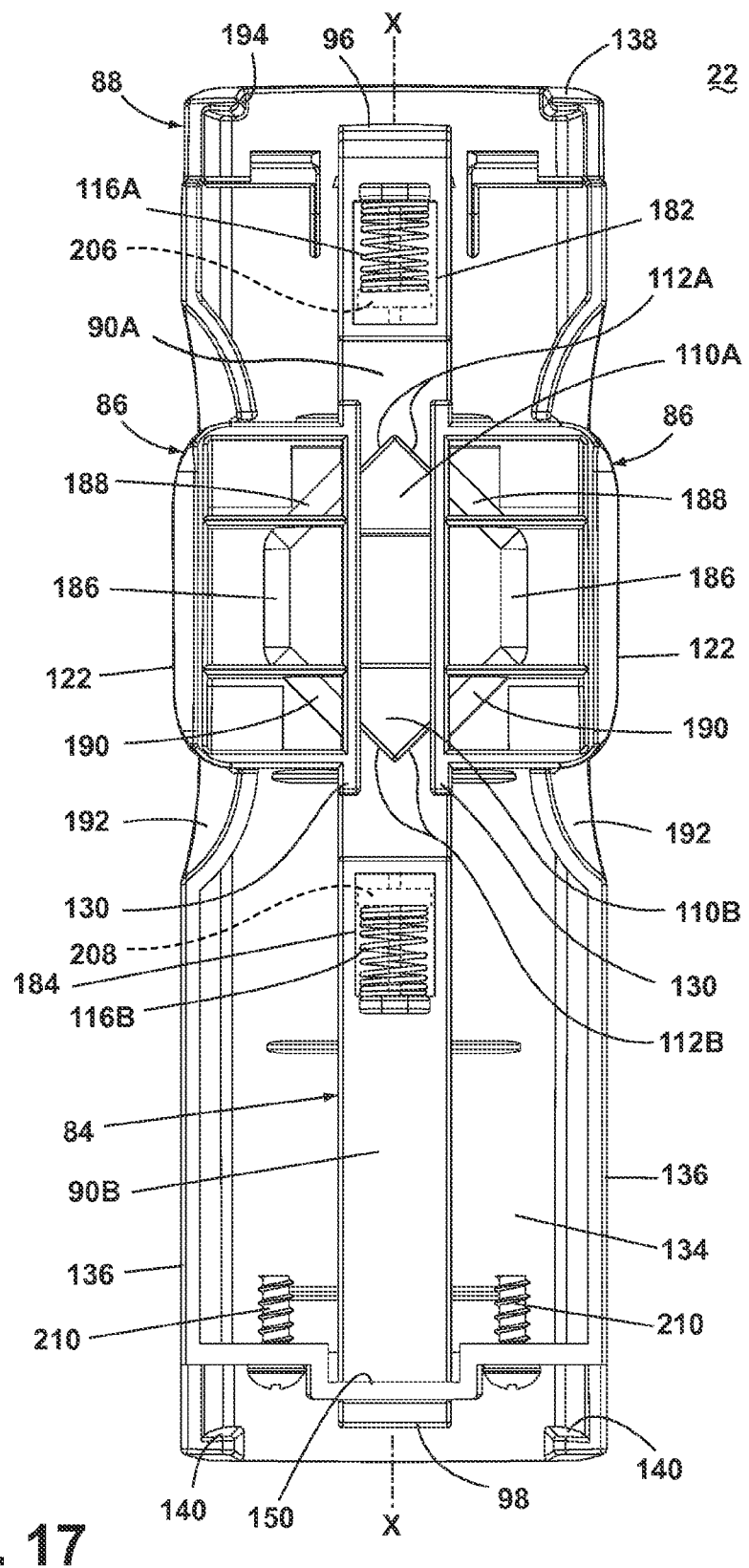
FIG. 17 is a rear view of the latch mechanism in the latched position shown in FIG. 16.
Figure 18:
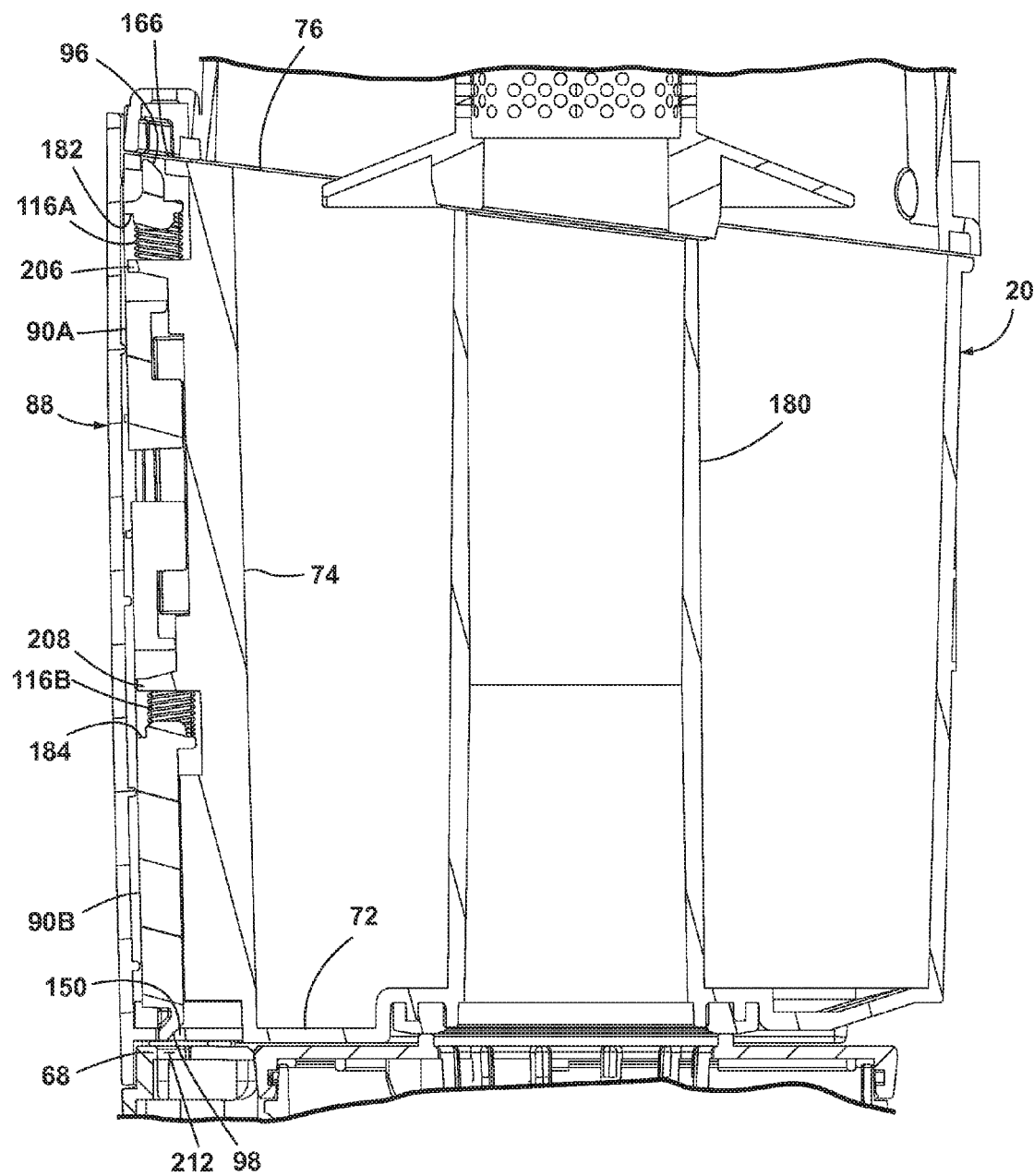
FIG. 18 is a cross-sectional view of the latch mechanism from FIG. 14, with the latch mechanism in an unlatched position.
Figure 19:
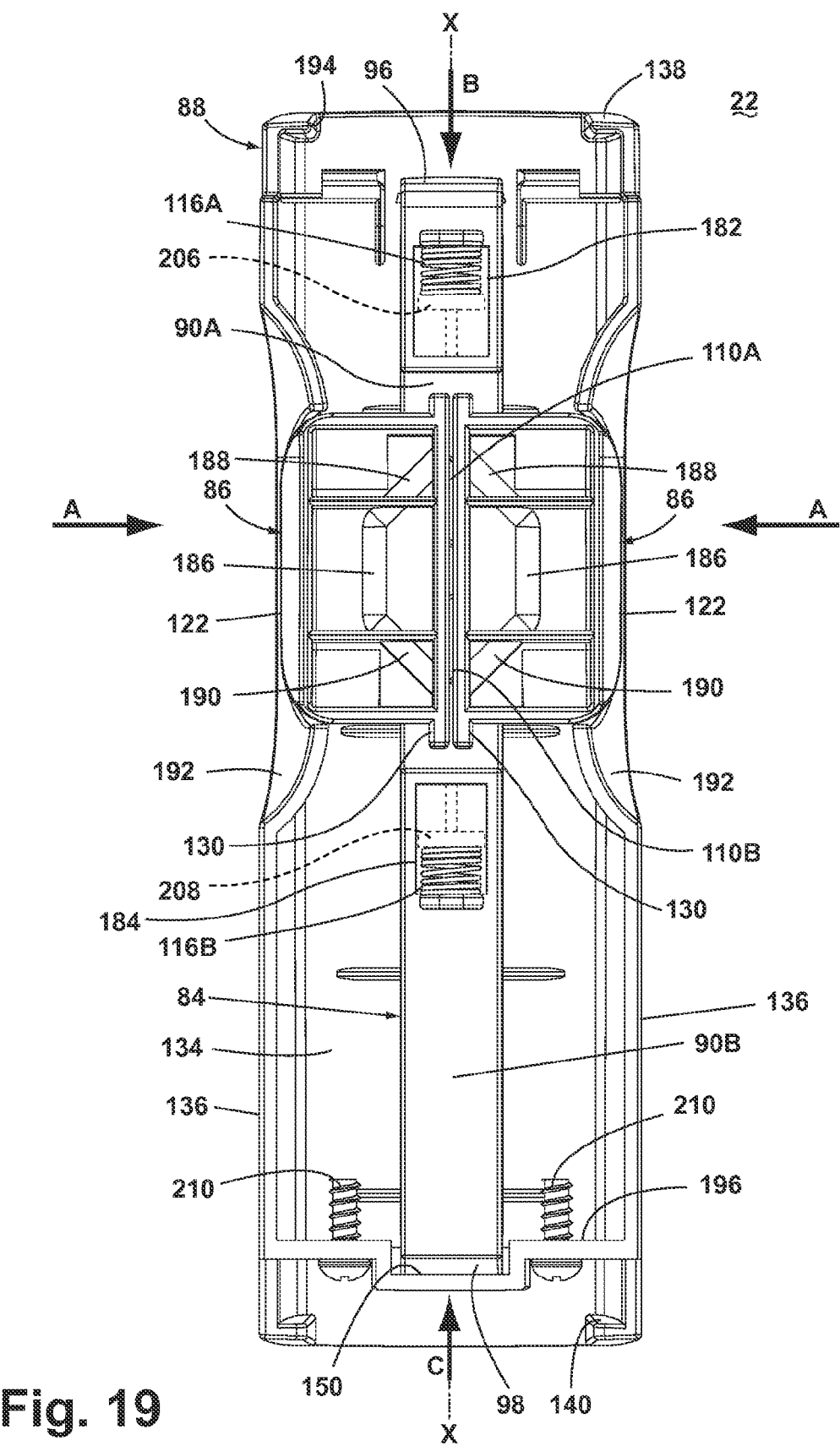
FIG. 19 is a rear view of the latch mechanism in the unlatched position shown in FIG. 18.

Once assembled, the latch mechanism 22 is movable between a latched position, shown in FIGS. 16 and 17, in which the dirt cup 20 is secured to the vacuum cleaner 10, and an unlatched position, shown in FIGS. 18 and 19, in which the dirt cup 20 can be removed from the vacuum cleaner 10. In the latched position, the dirt cup 20 is received within the dirt cup recess 64, with the bottom wall 72 of the dirt cup 20 resting on the bottom wall 68 of the dirt cup recess 64. The locking projection 96 is received within the locking recess 166 provided on the main body 16 and the relief projection 98 is received within the relief aperture 150 and a second locking recess 212 provided on the main body 16. As illustrated, the locking recess 212 can be formed in a portion of the bottom wall 68 of the dirt cup recess 64. The biasing elements 116A, 116B are relaxed and the buttons 122 are spaced from each other by the guide projections 110A, 110B.

To move the latch mechanism 22 from the latched position to the unlatched position, the latch actuator 86 is actuated by pressing the buttons 122 inwardly toward medial vertical axis X, as shown in arrow A. As the buttons 122 are pressed inwardly, the upper cam surfaces 188 bear against the cam follower surfaces 112A of the upper guide projection 110A and force the upper guide projection 110A, and thus the upper body 90A, downwardly along the medial vertical axis X. At the same time, the lower cam surfaces 190 bear against the cam follower surfaces 112B of the lower guide projection 110B and force the lower guide projection 110B, and thus the lower body 90B, upwardly along the medial vertical axis X. As such, pressing the buttons 122 inwardly results in the latch members 84A, 84B moving toward each other. Downward vertical movement of the upper body 90A, which is guided relative to the cover 88 and the dirt cup 20 by the upper lateral projections 202, causes the locking projection 96 to move out of the locking recess 166 as indicated by arrow B. Upward vertical movement of the lower body 90B, which is guided relative to the cover 88 and the dirt cup 20 by the lower lateral projections 204, causes the relief projection 98 to move upwardly in the relief aperture 150, as indicated by arrow C, and out of the locking recess 212. At this time, the biasing elements 116A, 116B are compressed by movement of their respective frame 182, 184 relative to their respective catch 206, 208 on the dirt cup. With the latch mechanism 22 in the unlatched position, the dirt cup 20 can be removed from the vacuum cleaner 10.

To remount the dirt cup 20 to the vacuum cleaner 10, the latch mechanism 22 is held in the unlatched position while the dirt cup 20 is seated in the dirt cup recess 64. Releasing the latch actuator 86 expands the biasing elements 116A, 116B and automatically returns the latch mechanism 22 back to the latched position. Upward vertical movement of the upper body 90A and downward vertical movement of the lower body 90B can be configured to cease once their respective biasing element 116A, 116B have expanded. It should be noted that while the actuator 86 is shown with two buttons 122 that are pressed inwardly toward each other, the latch mechanism 22 can employ only one button to deflect the upper and lower bodies 90A, 90B of the latch members 84A, 84B.

While the invention has been specifically described in connection with certain specific embodiments thereof, it is to be understood that this is by way of illustration and not of limitation, and the scope of the appended claims should be construed as broadly as the prior art will permit. The illustrated vacuum cleaner is but one example of the variety of vacuum cleaners with which this invention or some slight variant can be used. While shown and described for use with an upright or "stick"-type vacuum cleaner, the dirt cup 20 and latch mechanism 22 can be used with any type of vacuum cleaner, such as canister vacuum cleaners, robotic vacuum cleaners, handheld vacuum cleaners, or built-in central vacuum cleaning systems. The dirt cup 20 and latch mechanism 22 can also be used with vacuum cleaners adapted to take up fluids, such as extractors and steam cleaners. Reasonable variation and modification are possible within the forgoing disclosure and drawings without departing from the scope of the invention which is defined by the appended claims. It should also be noted that all elements of all of the claims may be combined with each other in any possible combination, even if the combinations have not been expressly claimed.

What is claimed is:

1. A vacuum cleaner comprising:
   a main body having a first locking recess and a second locking recess;
   a dirt cup removably mounted to the main body and having an outwardly-facing side wall; and
   a latch mechanism for selectively fastening the dirt cup to the main body, comprising:
      a first latch member movably mounted to the side wall of the dirt cup and having a portion that is selectively received by the first locking recess, the first latch member comprising a first cam follower surface thereon;
      a second latch member positioned in vertical alignment with the first latch member, and directed in an opposite axial direction with respect thereto, the second latch member being movably mounted in the side wall of the dirt cup and having a portion that is selectively received by the second locking recess; and
      a latch actuator comprising at least one button having a cam surface facing the first cam follower surface;
   wherein, when the at least one button is pressed, the cam surface bears against the first cam follower surface to initiate vertical movement of the first latch member relative to the latch actuator and actuates the second latch member contemporaneously with the first latch member, which moves the first and second latch members from a latched position in which the portion of the first and second latch members are received within the first and second locking recesses, respectively, to an unlatched position in which the portion of the first and second latch members are removed from the locking recesses, thereby allowing the dirt cup to be removed from the vacuum cleaner.

2. The vacuum cleaner of claim 1, wherein:
   the at least one button comprises a pair of juxtaposed buttons each having a cam surface thereon; and
   the first cam follower surface comprises a segmented cam follower surface, wherein each segment of the first cam follower surface is in register with a corresponding cam surface on one of the pair of juxtaposed buttons; and
   wherein, during movement of the pair of juxtaposed buttons relative to the first latch member, the cam surface on each one of the pair of juxtaposed buttons bears against the corresponding segment of the first cam follower surface and moves the first latch member vertically with respect to the latch actuator.

3. The vacuum cleaner of claim 2, wherein the movement of the pair of juxtaposed buttons is limited to an opposed lateral direction, whereby inward lateral movement of each button toward a medial vertical axis of the first latch member causes the actuation of the first latch member.

4. The vacuum cleaner of claim 1, wherein the second latch member comprises a second cam follower surface thereon in opposing vertical relationship to the first cam follower surface, and the cam surface is in register with the second cam follower surface.

5. The vacuum cleaner of claim 4, wherein, during inward lateral movement of the at least one button, the cam surface on the at least one button bears against the first and second cam follower surfaces to draw the first latch member and the second latch member vertically toward one another.

6. The vacuum cleaner of claim 1, wherein the first cam follower surface comprises a pair of ramped surfaces.

7. The vacuum cleaner of claim 1, wherein the ramped surfaces terminate at a common edge positioned along a medial vertical axis of the first latch member.

8. The vacuum cleaner of claim 1, further comprising a cover that at least partially mounts and encloses the first latch member and the latch actuator.

9. The vacuum cleaner of claim 8, wherein the cover comprises at least one aperture for receiving the at least one button therein.

10. The vacuum cleaner of claim 8, wherein at least one of the dirt cup and the cover comprises an elongated, vertically-extending guide track formed thereon which receives at least a portion of the first latch member to restrict the movement of the first latch member in a vertical direction with respect thereto.

11. The vacuum cleaner of claim 1, further comprising a spring biasing the portion of the first latch member into the locking recess on the main body.

12. The vacuum cleaner of claim 11, wherein the spring comprises a coil spring bearing against the latch member.

* * * * *